United States Patent [19]

Small

[11] Patent Number: 5,563,935
[45] Date of Patent: Oct. 8, 1996

[54] TELEPHONE ANSWERING SYSTEM WITH CALL SCREENING CIRCUIT

[76] Inventor: J. Gordon Small, 1276 Fieldview Ter., Howell, Mich. 48843

[21] Appl. No.: 291,988

[22] Filed: Aug. 17, 1994

[51] Int. Cl.⁶ .................................................... H04M 1/64
[52] U.S. Cl. .......................... 379/199; 379/67; 379/373
[58] Field of Search ............................... 379/199, 67, 88, 379/70, 79, 373

[56] References Cited

U.S. PATENT DOCUMENTS

| | | | |
|---|---|---|---|
| 3,611,363 | 10/1971 | McCrea et al. | 340/413 |
| 4,514,593 | 4/1985 | Hattori et al. | 379/74 |
| 4,578,540 | 3/1986 | Borg et al. | 379/40 |
| 4,625,079 | 11/1986 | Castro et al. | 379/77 |
| 4,660,218 | 4/1987 | Hashimoto | 379/93 |
| 4,791,664 | 12/1988 | Lutz et al. | 379/199 |
| 4,794,632 | 12/1988 | Burton et al. | 379/22 |
| 4,807,277 | 2/1989 | Perry | 379/102 |
| 4,817,133 | 3/1989 | Takahashi et al. | 379/199 |
| 4,827,501 | 5/1989 | Hansen et al. | 379/199 |
| 4,845,743 | 7/1989 | Lutz | 379/199 |
| 4,850,013 | 7/1989 | Rose | 379/199 |
| 4,860,347 | 8/1989 | Costello | 379/199 |
| 4,891,834 | 1/1990 | Sezaki et al. | 379/67 |
| 4,926,470 | 5/1990 | Sanford | 379/199 |
| 4,939,772 | 7/1990 | Goto | 379/96 |
| 4,998,273 | 3/1991 | Nichols | 379/102 |
| 5,048,076 | 9/1991 | Maurer et al. | 379/94 |
| 5,056,132 | 10/1991 | Coleman et al. | 379/95 |
| 5,062,133 | 10/1991 | Melrose | 379/94 |
| 5,157,712 | 10/1992 | Wallon, Jr. | 379/74 |

FOREIGN PATENT DOCUMENTS

| | | | |
|---|---|---|---|
| 2260670 | 4/1993 | United Kingdom | 379/199 |

Primary Examiner—Jeffery Hofsass
Assistant Examiner—Daniel S. Hunter
Attorney, Agent, or Firm—Gifford, Krass, Groh, Sprinkle, Patmore, Anderson & Citkowski, P.C.

[57] ABSTRACT

A telephone answering system is provided for use in combination with a telephone line adapted to receive incoming telephone calls, a telephone and a telephone answering machine. The system includes a circuit electrically connected to the telephone line for detecting and intercepting an incoming telephone call. Following interception of the telephone call, the circuit receives a frequency encoded signal from the caller produced by the caller pressing a predetermined sequence of numbers on a touch tone telephone. Thereafter, the entered code is compared with a user definable preset code. In the event that the entered code matches the preset code, the circuit directs the telephone call to the telephone, causing it to ring normally. In the event that the entered code matches a special access code different from the preset code, the circuit directs the telephone call to the telephone and activates the telephone to ring more rapidly than normal. If the entered code neither matches the preset code, nor the special access code, or if no code is entered, the circuit electrically connects the telephone line to the telephone answering machine.

3 Claims, 2 Drawing Sheets

TELEPHONE ANSWERING SYSTEM WITH CALL SCREENING CIRCUIT

BACKGROUND OF THE INVENTION

I. Field of the Invention

The present invention relates generally to telephone answering systems and, more particularly, to a telephone answering system for allowing subscribers to make informed decisions as to whether to answer the telephone.

II. Description of the Prior Art

There are a number of telephone answering machines on the market that are electrically connected to telephone receivers. These telephone answering machines typically monitor the number of rings produced by an incoming telephone call. When the number of rings exceeds a predetermined amount, the telephone answering machine intercepts the incoming call and records any message from the caller.

There are also telephone answering machines that help people avoid the interruption of undesired telephone calls. These machines differentiate calls from friends and calls from strangers based upon a code entered by the caller. If a correct code is entered, the call is routed to the telephone. However, if an incorrect code is entered, or none at all, the call is routed to the answering machine. Thereafter, the person returns his or her calls as desired and when desired.

There are still other times when people do not want to be interrupted by a telephone call, even calls from friends having the preassigned code. However, these previously known answering machines do not allow for certain calls requiring immediate attention, such as calls from family members, to be differentiated from undesired telephone calls from friends.

SUMMARY OF THE PRESENT INVENTION

The present invention provides a telephone answering system which overcomes the above mentioned disadvantages of the previously known devices.

In brief, the present invention comprises means electrically connected to the telephone line for detecting an incoming telephone call and for generating a call detection signal representative thereof. This call detection signal is connected to a microprocessor.

Upon receipt of the call detection signal, the microprocessor intercepts the incoming telephone call and thereafter waits for a predetermined period of time to receive a coded signal on the telephone line from the caller. This coded signal is preferably a frequency encoded signal which is generated by the caller by the caller pressing a preset sequence of numbers on the caller's touch tone telephone.

The microprocessor then compares the coded signal received from the caller with a user definable preset code. In the event that the received code matches the preset code, the microprocessor generates a first signal to a steering logic circuit which electrically connects the telephone line to the user's telephone. Once connected to the telephone, the microprocessor generates output signals via a ring generator to the telephone to ring the telephone in a first ring pattern.

Other persons, e.g. family members from whom telephone calls will always be received, are assigned a special access code which is different than the preset code. When the special access code is entered by the user, the microprocessor also generates a first signal to a steering logic circuit which electrically connects the telephone line to the user telephone. Additionally, however, the microprocessor generates a signal to the ring generator to cause the telephone to ring in a second ring pattern different than the first ring pattern, e.g. more rapidly than the first ring pattern. The second ring pattern thus alerts the called party that a person having the special access code is calling.

If the coded signal received from the caller neither matches the preset code, nor the special access code, or if the caller does not enter any code within a preset time period, the microprocessor generates a second signal to the steering logic which automatically connects the telephone line to the telephone answering machine.

In practice, friends, business associates and other persons for whom telephone access is usually desired are given the preset code of the telephone answering system. All of these persons are able to gain access to the telephone and activate the first ring pattern by entering the proper code once the telephone answering system has intercepted the telephone call. Conversely, only those people, such as family members, from whom calls are always received will be given the special access code. When these people call using the special access code, the system will activate the telephone with the second ring pattern, informing the residents that the telephone call is from a family member or the like.

BRIEF DESCRIPTION OF THE DRAWING

A better understanding of the present invention will be had upon reference of the following detail description when read in conjunction with the accompanying drawing, wherein like reference characters referred to like parts throughout the several views, and in which.

DETAILED DESCRIPTION OF A PREFERRED EMBODIMENT OF THE PRESENT INVENTION

Figure 1:
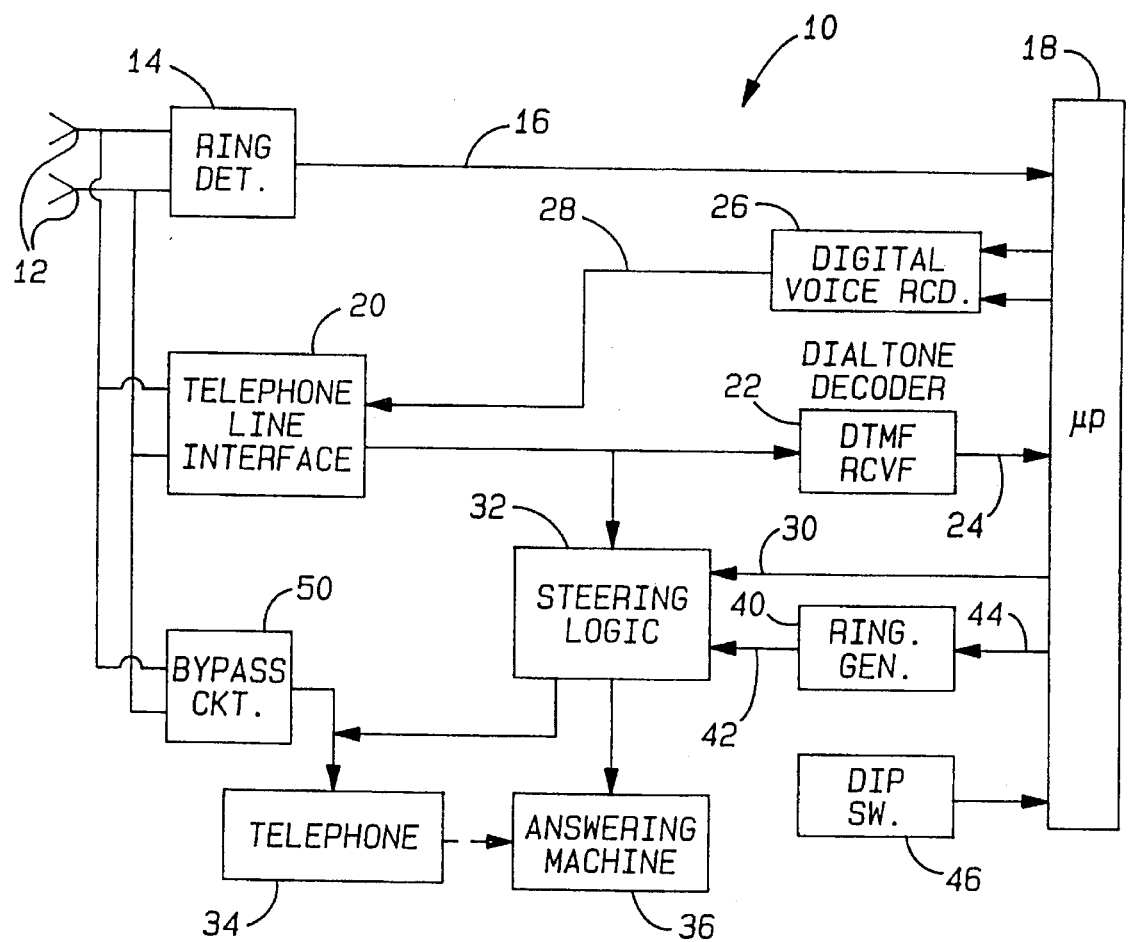
FIG. 1 is a block diagrammatic view illustrating a preferred embodiment of the present invention.

With reference first to FIG. 1, a block diagrammatic view of a preferred embodiment of the telephone answering system 10 of the present invention is there shown for connection with a telephone line 12. The telephone line 12, in the well known fashion, is electrically connected to receive incoming telephone calls from an outside caller.

A ring detector circuit 14 is electrically connected to the telephone line 12. The ring detector circuit 14 detects an incoming telephone call and, in response thereto, generates an output signal on output line 16 to a microprocessor 18. The ring detector circuit 14 is of any conventional construction.

The telephone line 12 is also connected to a telephone line interface circuit 20 having an output signal connected as an input signal to a dial tone decoder circuit (DTMF) 22. The dial tone decoder circuit 22, in the well known fashion, decodes the previously encoded audio signals produced by a touch tone telephone and provides a digitally encoded output along its output line 24 to the microprocessor 18 representative of the key depressed on the touch tone dial pad.

The microprocessor 18 provides output signals through a digital voice recorder 26 which has its output line 28 connected to the telephone line interface 20. Thus, upon activation by the microprocessor 18, the digital voice recorder 26 generates an audible signal to the caller on the telephone line 12.

The microprocessor 18 further generates an output control signal on its output line 30 to a steering logic circuit 32. The steering logic circuit 32, depending upon the signal it receives from the microprocessor 18 on line 30, selectively electrically connects the telephone line interface 20 with either a telephone receiver 34 and a telephone answering machine 36, or to only the answering machine 36. Thus, if the call is routed to both the receiver 34 and answering machine 36, the answering machine 36 can intercept the telephone call after a predetermined number of rings on the telephone 34 in the conventional fashion.

The system 10 also includes a ring generator 40 having its output line 42 connected via the steering logic 32 to either the telephone receiver .34 and answering machine 36 or only to the answering machine. The activation of the ring generator 40 is controlled by an output line 44 from the microprocessor 18.

In addition, a plurality of switches, such as a DIP switch assembly 46, provides an input signal to the microprocessor 18 representative of a code for the system 10. This code can be set and changed by the user of the telephone answering system to represent a sequential numerical code such as "42". This preset code "42" is then given to persons for whom telephone access for incoming calls is usually desired. There can also be a DIP switch as a part of the DIP switch assembly 46 that allows the subscriber to turn on or off the various messages to callers from the digital voice recorder 26.

Lastly, the system 10 includes a bypass circuit 50 which, when switched by the user, directly connects the telephone line 12 to the telephone receiver 34 and disables the remaining components of the telephone answering system 10. Such a bypass circuit 50 is used when it is desirable to receive all incoming calls, regardless of their nature or origin.

Figure 2:
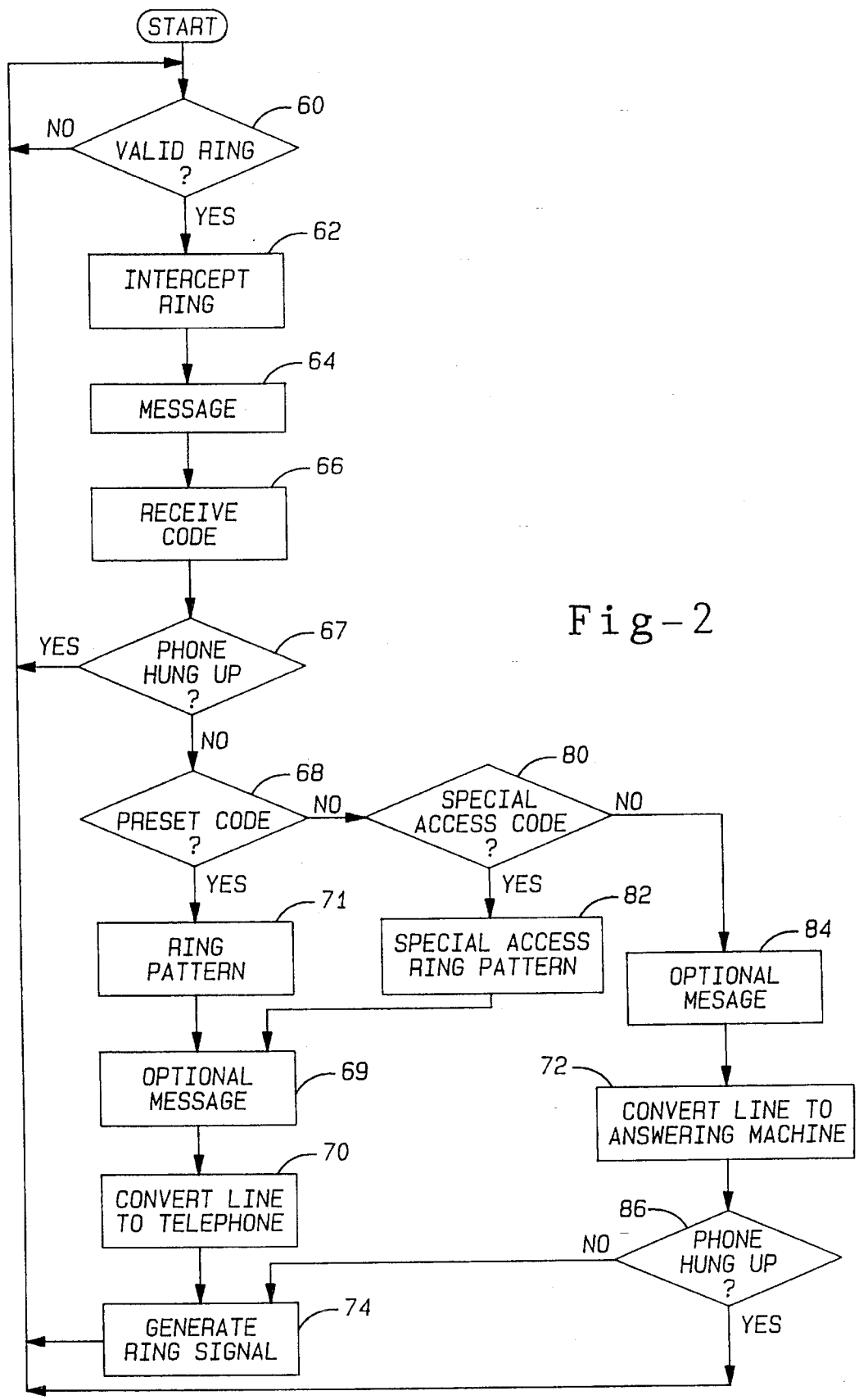
FIG. 2 is a flow chart illustrating the operation of the preferred embodiment of the present invention.

With reference now to FIG. 2, the operation of the telephone system of the present invention will now be described. The flow chart shown in FIG. 2, of course, exists in the form of a computer program for the microprocessor 18. The program is preferably stored in read only memory (ROM).

At step 60, the program determines if a valid ring is detected on the telephone line 12. If not, step 60 continually loops back to itself until a telephone ring is detected.

Once a valid telephone ring is detected, the ring circuit 14 (FIG. 1) generates an output signal on line 16 to the microprocessor 18 so that step 60 branches to step 62. At step 62, the microprocessor 18 intercepts or answers the telephone call and, immediately thereafter, branches to step 64. At step 64, the microprocessor 18 generates an output signal to the digital voice recorder 26 which generates an audible message to the telephone line 12 via the line interface 20. This audible message, for example, could be "Enter your personal identification code".

Step 64 then branches to step 66 which receives the touch tone code inputted by the telephone caller. As previously discussed, this touch tone code or sequence in numbers is decoded by the dial tone decoder 22 and processed as a digital signal by the microprocessor 18. Step 66 then branches to step 67.

At step 67, the microprocessor 18 determines whether the caller has hung up. If the caller has hung up, step 67 branches to step 60. If the caller is still on the line, step 67 branches to step 68.

At step 68, the microprocessor 18 compares the inputted code from the telephone caller with the preset code set for the telephone system 10 as set by the DIP switches 46. If the inputted code from the caller matches the preset code, step 68 branches to step 71 where the program stores a variable representative of a first ring pattern. Step 71 then branches to step 69.

At step 69, an optional message such as "Your call is now being routed to the telephone," will be played to the caller informing him that he is being transferred to the telephone line. This is accomplished by the microprocessor 18 generating an output signal to the digital voice recorder 26 which generates an audible message to the telephone line 12 via the line interface 20. Step 69 then branches to step 70.

At step 70, the microprocessor 18 generates output signals on line 30 to steering logic circuit 32 which electrically connects the telephone line 12 via interface circuit 20 with the telephone receiver 34. Lastly, at step 74 the microprocessor 18 using the stored variable from step 71 generates a ring signal to the telephone via the ring generator 40 in the first ring pattern, e.g., one ring per second.

If the inputted code from the caller does not match the preset code, or if no code is entered within a preset time, step 68 branches to step 80. At step 80, the inputted code from the caller is compared to a special access code, which differs from the preset code by a predetermined amount. If the inputted code matches the special access code, step 80 branches to step 82. At step 82 the microprocessor 18 stores a second variable representative of a second ring pattern which differs from the first ring pattern. For example, the second ring pattern is preferably two rings per second versus one ring per second for the first ring pattern. Step 82 then branches to step 69.

As previously described, step 69 optionally generates an audio message to the caller and then branches to step 70 where the steering logic circuit 32 connects the telephone line 12 to the telephone receiver 34. Step 70 then branches to step 74.

At step 74, the microprocessor 18 uses the variable representative of the second ring pattern stored at step 82 to activate the telephone in the second ring pattern, e.g., two rings per second. Step 74 then branches to step 60.

Assuming that neither the special access code nor the preset code is entered by the caller, step 80 branches to step 84. At step 84, an optional message may be played to the caller informing him that he is being transferred to the answering machine. This is accomplished by the microprocessor 18 generating an output signal to the digital voice recorder 26 which generates an audible message to the telephone line 12 via the line interface 20. Step 84 then branches to step 72.

At step 72, the microprocessor 18 generates output signals on line 30 to the steering logic circuit 32 to electrically connect the telephone line 12 via the line interface circuit 20 to the telephone answering machine 36. Step 72 then branches to step 86 to determine whether the caller has hung up the telephone. If the caller has hung up the telephone, step 86 branches back to step 60.

When the telephone answering machine 36 is electrically connected to the telephone line 12 by step 72, the microprocessor 18 sends a signal on line 44 to the ring generator 40 which produces a telephone ring signal to the telephone answering machine 36. After a preset number of rings, the answering machine 32 processes the telephone call in the normal fashion.

The telephone 34 is also connected with the telephone answering recorder 36 in the conventional fashion so that the answering recorder 36 automatically answers the telephone 34 after a predetermined number of rings even when the preset or special access code is entered. Such an instance would occur, for example, when the telephone system 10 is unattended and a telephone call is received from an authorized caller, i.e. a caller with the preset code or special access code.

In view of the foregoing, it can be seen that the present invention provides a simple and yet, highly effective system for monitoring incoming telephone calls.

Having described my invention, however, many modifications thereto will become apparent to those skilled in the art to which it pertains without deviation from the spirit of the invention as defined by the scope of the appended claims.

I claim:

1. A telephone answering system for use in combination with a telephone line adapted to receive incoming calls, a telephone and a telephone answering recorder, said system comprising:

means electrically connected to the telephone line for detecting an incoming telephone call and for generating a call detection signal representative thereof, means responsive to said call detection signal for intercepting the incoming telephone call and for thereafter receiving a coded signal from the telephone line, means for comparing said coded signal with a preset code and a special access code and for generating a first signal when said coded signal equals said preset codes, for generating a second signal when said coded signal equals said special access code and for otherwise generating a third signal, means responsive to said first signal for electrically connecting the telephone line with the telephone and for activating the telephone in a first ring pattern, means responsive to said second signal for electrically connecting the telephone line with the telephone and for activating the telephone in a second ring pattern, said second ring pattern being different from said first ring pattern, and means responsive to said third signal for electrically connecting the telephone line with the telephone answering recorder, wherein said coded signal comprises a frequency encoded signal and wherein said comparing means comprises a frequency decoder, wherein said comparing means further comprises a microprocessor electrically connected to said frequency decoder and user definable means for setting said preset code, wherein said user definable means comprises a plurality of switches, said plurality of switches forming an input signal directly electrically connected to said microprocessor.

2. The invention as defined in claim 1 and comprising bypass means for disabling said system and simultaneously connecting the telephone to the telephone line.

3. The invention as defined in claim 1 wherein said special access code differs from said preset code by a preset amount.

* * * * *